(12) United States Patent
Fuse et al.

(10) Patent No.: US 6,872,108 B2
(45) Date of Patent: Mar. 29, 2005

(54) DRIVE SHAFT BEARING STRUCTURE FOR WATERCRAFT

(75) Inventors: Tomohiro Fuse, Saitama (JP); Masahiko Tsuchiya, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/219,497

(22) Filed: Aug. 16, 2002

(65) Prior Publication Data

US 2003/0060097 A1 Mar. 27, 2003

(30) Foreign Application Priority Data

Sep. 18, 2001 (JP) ........................................ 2001-284063

(51) Int. Cl.[7] .............................................. B63H 23/34
(52) U.S. Cl. ........................................ 440/83; 440/112
(58) Field of Search ............................. 440/38, 49, 83, 440/112; 184/5.1; 384/322, 397

(56) References Cited

U.S. PATENT DOCUMENTS

| | | | | |
|---|---|---|---|---|
| 3,565,447 A | * | 2/1971 | Joachim et al. | 277/504 |
| 4,395,141 A | * | 7/1983 | Pietsch et al. | 384/147 |
| 4,722,707 A | * | 2/1988 | Murase | 440/112 |
| 5,372,526 A | * | 12/1994 | Ozawa et al. | 440/112 |
| 5,522,335 A | * | 6/1996 | Veronesi et al. | 114/151 |
| 5,558,456 A | * | 9/1996 | Nakase et al. | 440/83 |
| 5,730,633 A | * | 3/1998 | Henmi et al. | 440/112 |
| 5,755,446 A | * | 5/1998 | Dean et al. | 277/358 |
| 5,795,198 A | * | 8/1998 | Pedone | 440/112 |

FOREIGN PATENT DOCUMENTS

JP  07112679 A  5/1995

* cited by examiner

*Primary Examiner*—Andrew D. Wright
(74) *Attorney, Agent, or Firm*—Birch, Stewart, Kolasch & Birch, LLP

(57) ABSTRACT

A bearing body for rotatably supporting a drive shaft for driving an impeller on a watercraft body includes a bearing chamber containing bearing members rotatably supporting the drive shaft. Seal members are disposed on both sides of the bearing members and partition the bearing chamber by making contact with an outside circumferential surface of the drive shaft. The seal members are disposed so that grease in the bearing chamber does not leak out through the contact portions between the seal members and the outside circumferential surface of the drive shaft, and a breather passage is communicated with the bearing chamber. Two bearing members within the bearing chamber have a space formed between the bearing members, e.g., to form a grease reservoir between the bearing members. The aforementioned bearing structure reduces the necessity of maintenance, e.g., supplying grease to a drive shaft bearing portion, or at least the reduces the required frequency of maintenance.

15 Claims, 7 Drawing Sheets

DRIVE SHAFT BEARING STRUCTURE FOR WATERCRAFT

CROSS-REFERENCES TO RELATED APPLICATIONS

This nonprovisional application claims priority under 35 U.S.C. §119(a) on Patent Application No. 2001-284063 filed in Japan on Sep. 18, 2001, the entirety of which is herein incorporated by reference.

BACKGROUND OF THE INVENTION

1. Field of the Invention

The present invention relates to a drive shaft bearing structure, and more particularly to a drive shaft bearing structure for watercraft.

2. Description of the Background Art

As seen in FIG. 7 of the present application, a drive shaft bearing structure for watercraft of the background art has been known. In addition, Japanese Patent Laid-open No. Hei 7-112697, the entirety of which is hereby incorporated by reference, describes a drive shaft bearing structure of the background art. As seen in FIG. 7, a driven-side coupler 2 connected to a driving-side coupler of an engine (not shown) is fixed to the front end of a drive shaft 1. An impeller (not shown) is fixed to the rear end of the drive shaft 1. Power from the engine is transmitted to the impeller, whereby the impeller is rotationally driven.

The bearing structure includes a bearing body 4 for rotatably supporting the drive shaft 1 relative to a watercraft body 3. The bearing body 4 includes a bearing member 5 (in the structure shown, a ball bearing) rotatably supporting the drive shaft 1, a bearing chamber 6 for containing the bearing member 5, and seal members 7, 7 disposed on both sides (front and rear sides in the axial direction) of the bearing member 5. The seal members 7, 7 partition the bearing chamber 6 by making contact with the outside circumferential surface 1a (in the structure shown, the outside circumferential surface of a sleeve 1' rotated together with the shaft 1) of the drive shaft 1.

The present inventors have determined that the background art suffers from the following problems. In such a bearing structure, the bearing body 4 is mounted on the watercraft body 3 in the condition where the bearing chamber 6 is filled with grease. This is for imparting a smooth rotation of the bearing member 5. Where the bearing body 4 and the drive shaft 1 are mounted on the watercraft body 3, the seal members 7, 7 make contact with the outside circumferential surface 1a of the drive shaft 1 to partition the bearing chamber 6 as described above, and the bearing chamber 6 is maintained basically airtight. Therefore, unless the drive shaft 1 is rotated (hence, the watercraft runs), the grease charged in the bearing chamber 6 will not easily leak out of the bearing chamber 6.

However, the drive shaft 1 is actually rotated by the driving of the engine, and the impeller is rotated to move the watercraft, so that the temperature inside the bearing chamber 6 is raised due to the rotation of the drive shaft 1 and the bearing member 5. When the temperature in the bearing chamber 6 is raised, the grease and/or air in the bearing chamber 6 expands. According to the bearing structure as described above, an end portion 7a of the seal member 7 is disposed toward the outside of the bearing chamber 6.

Therefore, when the grease or air in the bearing chamber 6 expands over a predetermined level, the grease or air in the bearing chamber 6 leaks out to the exterior through a gap formed between the contact portion 7b for the outside circumferential surface 1a of the shaft 1 of the seal member 7 and the outside circumferential surface 1a of the shaft 1. The leaking out of the grease or air is due to deformation of the seal member 7 arising from the rise of the pressure inside the bearing chamber 6.

Accordingly, even when the grease or air in the bearing chamber 6 expands, excessive deformation of the seal member 7 due to this expansion is obviated. However, the leaking out of the grease in the bearing chamber 6 from the bearing chamber 6 due to the temperature rise in the bearing chamber 6 and the attendant expansion of the grease and air in the bearing chamber 6 can be problematic. A watercraft generally cycles or repeats through periods of running and stopping, whereby the temperature in the bearing chamber 6 (and hence expansion and contraction of the grease or air in the bearing chamber 6) rises and falls repeatedly. When the temperature is lowered, air penetrates into the bearing chamber 6 through minute gaps and clearances. When the temperature is raised, the air expands to push out the grease to the exterior of the bearing chamber 6. Therefore, the grease in the bearing chamber 6 is reduced in amount in a comparatively short time as the watercraft repeatedly stops, starts and operates.

Accordingly, and depending on the running patterns of the watercraf, it is necessary to charge the grease into the bearing chamber 6 at comparatively short intervals in the bearing structures of the background art. Accordingly, maintenance intervals and effort is increased with the systems of the background art.

SUMMARY OF THE INVENTION

The present invention overcomes the shortcomings associated with the background art and achieves other advantages not realized by the background art.

An object of the present invention is to provide a drive shaft bearing structure for watercraft by which the above-mentioned problems are solved, and maintenance procedures and requirements are reduced and/or eliminated.

One or more of these and other objects are accomplished by a drive shaft bearing structure for a watercraft having a drive shaft, an impeller and a watercraft body, the drive shaft bearing structure comprising a bearing body rotatably supporting the drive shaft for driving the impeller on the watercraft body, the bearing body including a bearing member rotatably supporting the drive shaft, a bearing chamber containing the bearing member, and a plurality of seal members disposed on a forward side and an after side of the bearing member, the seal members partitioning the bearing chamber and making contact with an outside circumferential surface of the drive shaft; and a breather passage, the breather passage being in communication with the bearing chamber and having a first end portion and a second end portion.

One or more of these and other objects are further accomplished by a drive shaft bearing structure for a watercraft having a drive shaft, an impeller, and a watercraft body, the drive shaft bearing structure comprising a bearing body rotatably supporting the drive shaft for driving the impeller on the watercraft body, the bearing body including a bearing member rotatably supporting the drive shaft, the bearing member having a first side and a second side, a bearing chamber containing the bearing member, and a plurality of seal members disposed on the first side and the second side of the bearing member, the seal members each having at least one contact portion, the seal members partitioning the bearing chamber and engaging an outside circumferential surface of the drive shaft with the at least one contact portions; a grease chamber, wherein the seal members prevent grease within the grease chamber from leaking from the grease chamber between the contact portions of the seal members and the outside circumferential surface of the drive shaft; and a breather passage, the breather passage being in communication with the bearing chamber and having a first end portion and a second end portion.

One or more of these and other objects are further accomplished by a watercraft drive shaft bearing structure comprising a drive shaft; an impeller operatively driven by the drive shaft; a rubber bearing body rotatably supporting the drive shaft for driving the impeller; a bearing member rotatably supporting the drive shaft, the bearing member having a first side and a second side; a bearing chamber containing the bearing member; a plurality of seal members disposed on the first side and the second side of the bearing member, the seal members each having at least one contact portion and the seal members partitioning the bearing chamber and engaging an outside circumferential surface of the drive shaft with the at least one contact portions; a grease chamber, wherein the seal members prevent grease within the grease chamber from leaking out from between the contact portions of the seal members and the outside circumferential surface of the drive shaft; and a breather passage, the breather passage being in communication with the bearing chamber and having a first end portion and a second end portion, the first end portion detachably connected to the bearing body to permit a delivery of grease to the grease chamber.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

Figure 1:
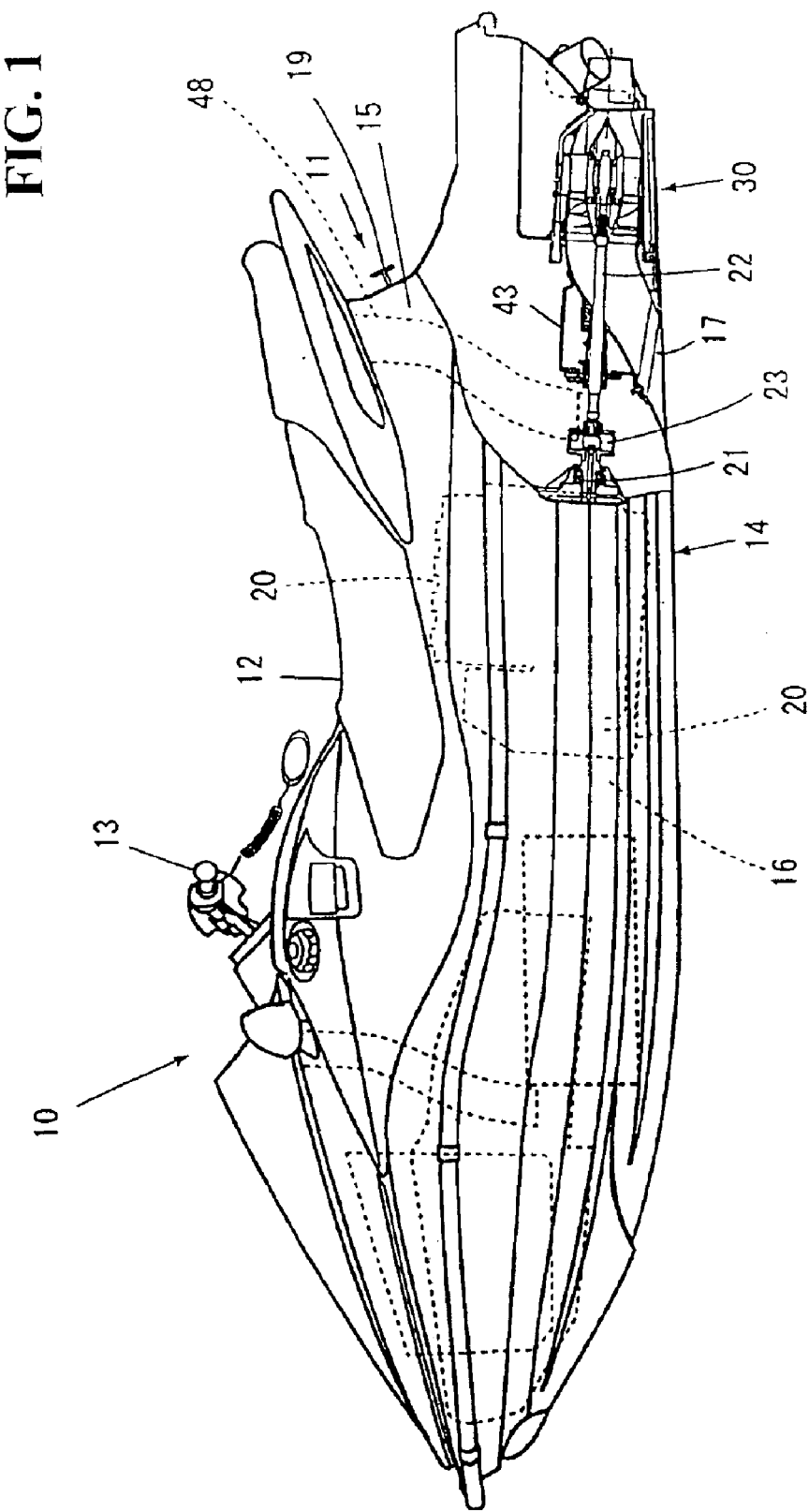
FIG. 1 is a partially cutout, side view of a personal watercraft having a a drive shaft bearing structure for watercraft according to a first embodiment of the present invention.
Figure 2:
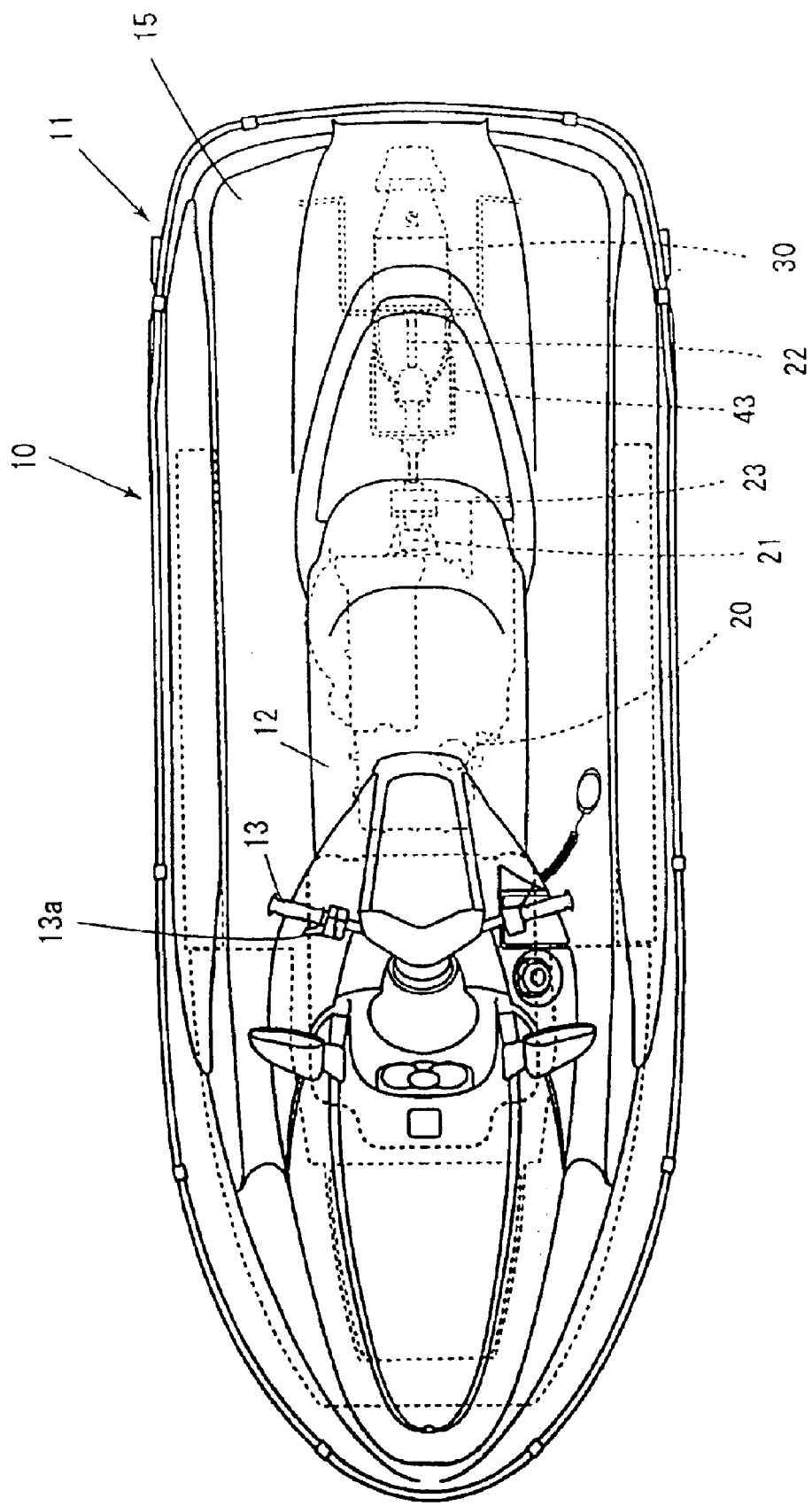
FIG. 2 is a general plan view of the same of the personal watercraft shown in FIG. 1.
Figure 3:
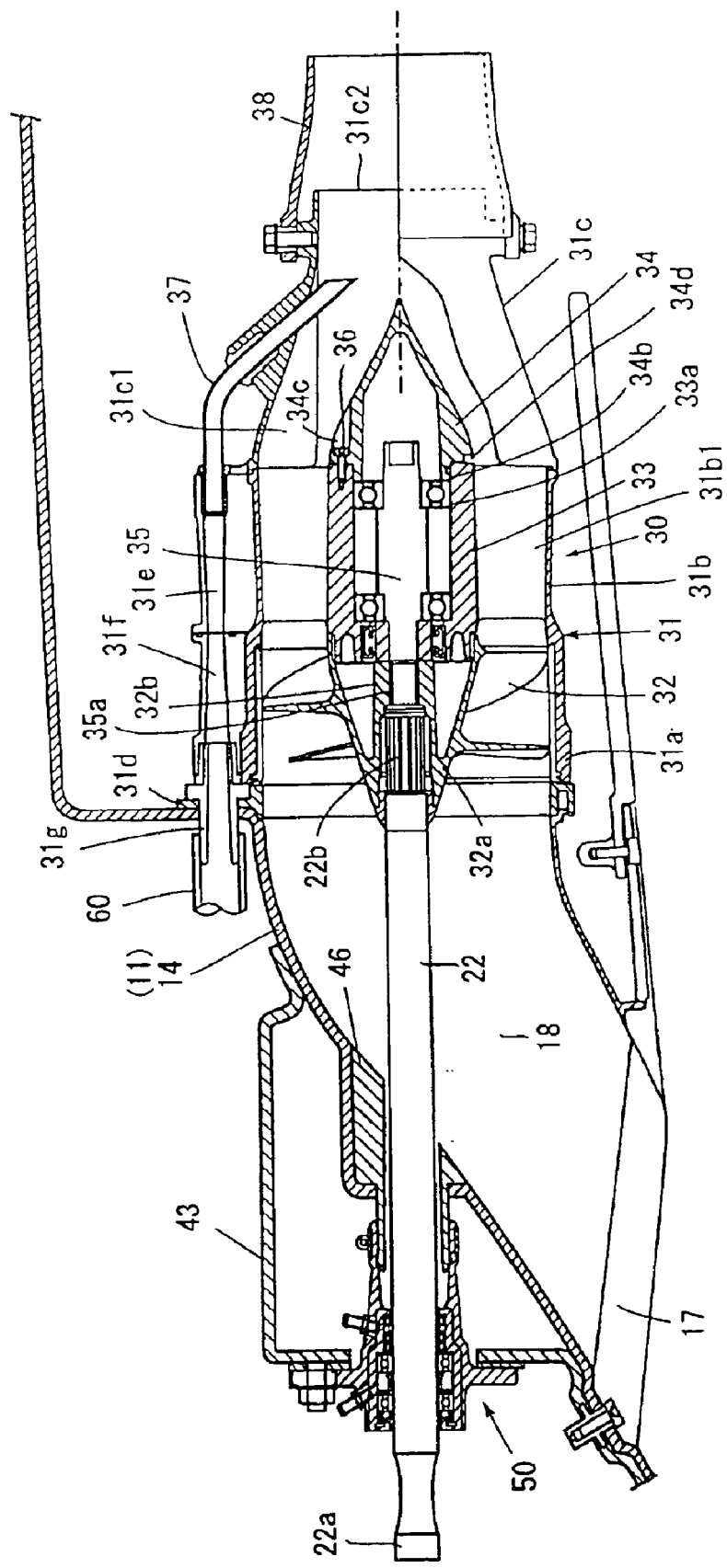
FIG. 3 is a sectional view a jet pump and a bearing structure of a drive shaft according to the present invention.
Figure 4:
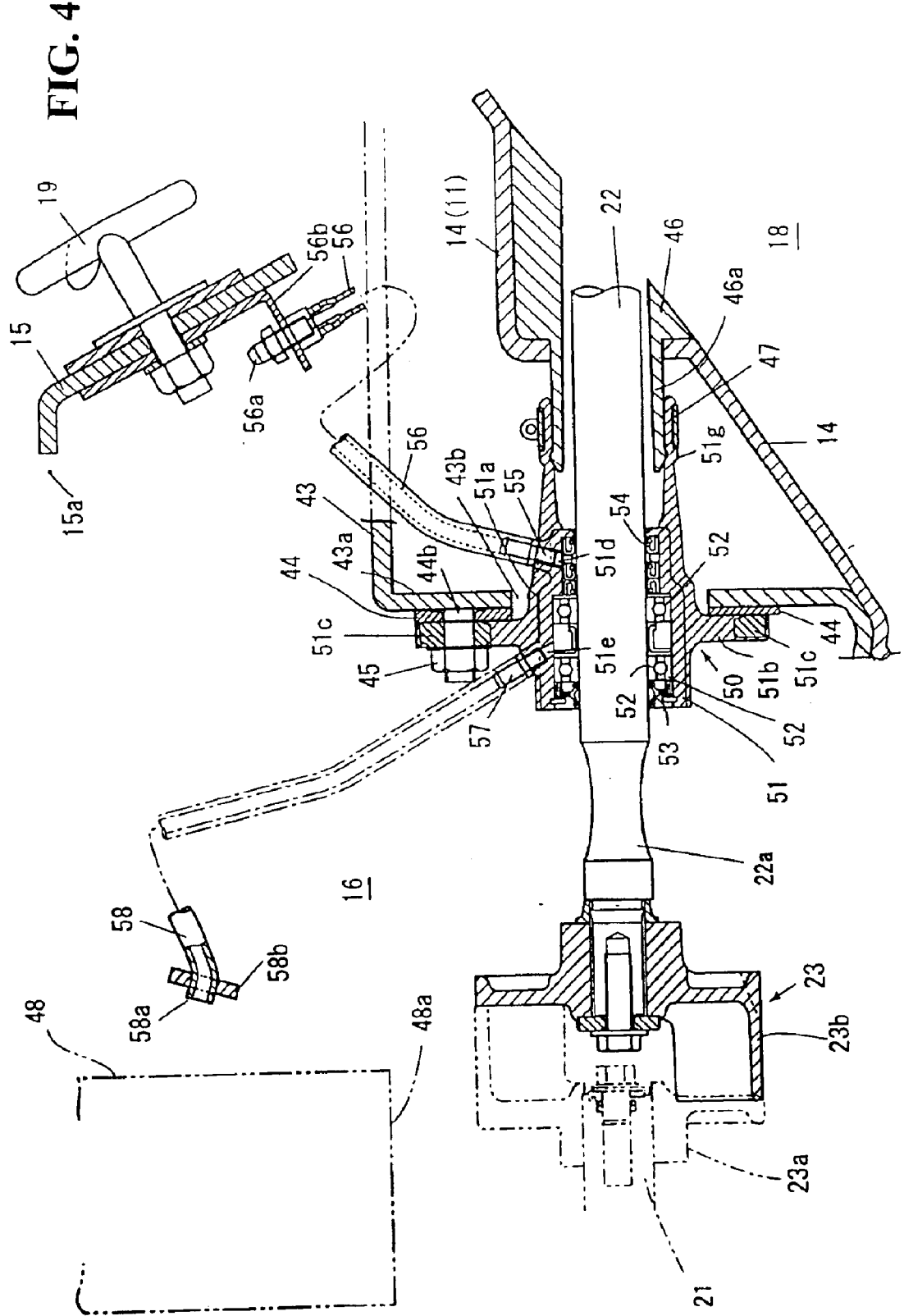
FIG. 4 is a partial, enlarged view of the structure shown in FIG. 3.
Figure 5:
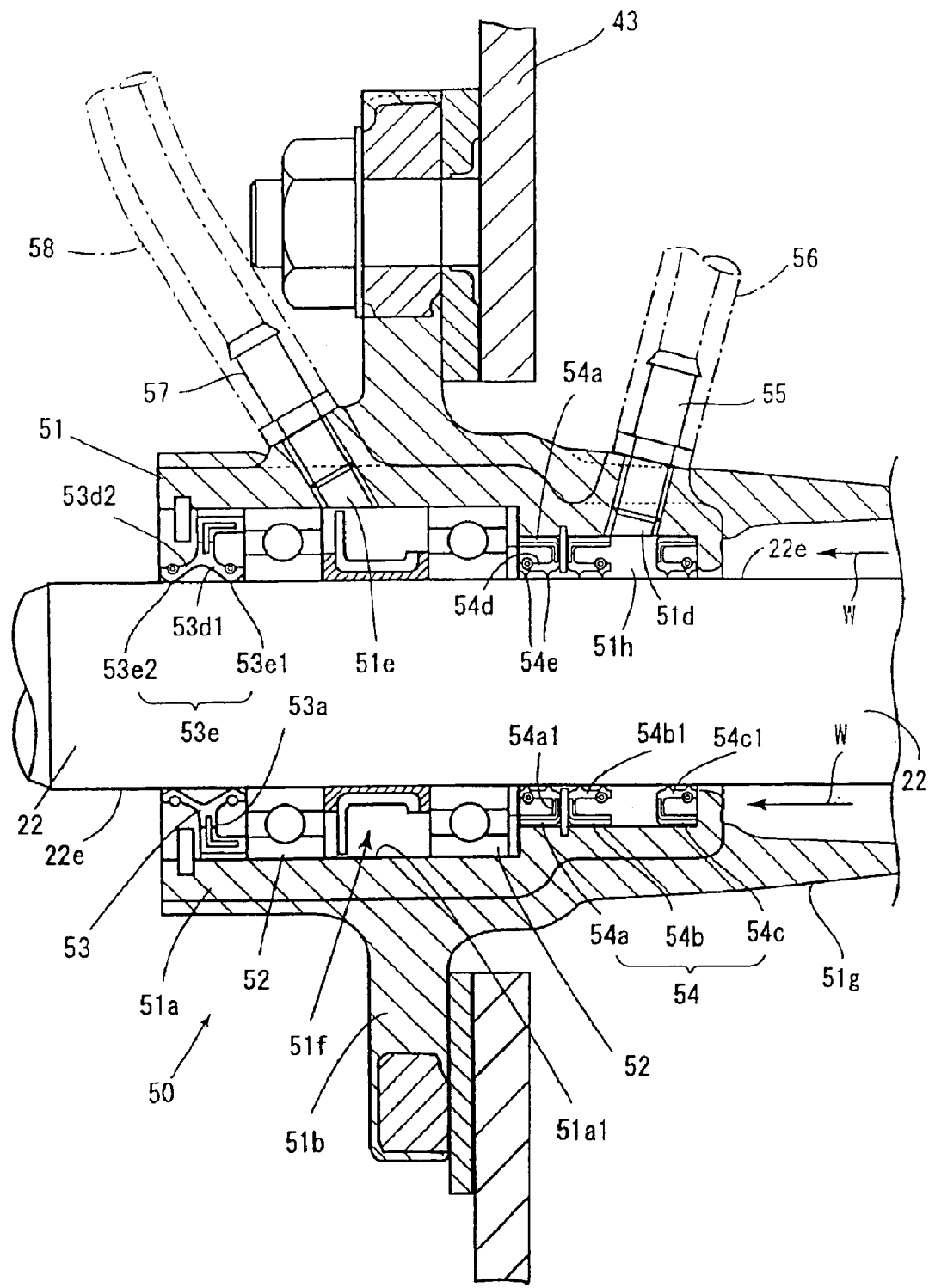
FIG. 5 is a partial, enlarged view of the structure shown in FIG. 4.
Figure 6:
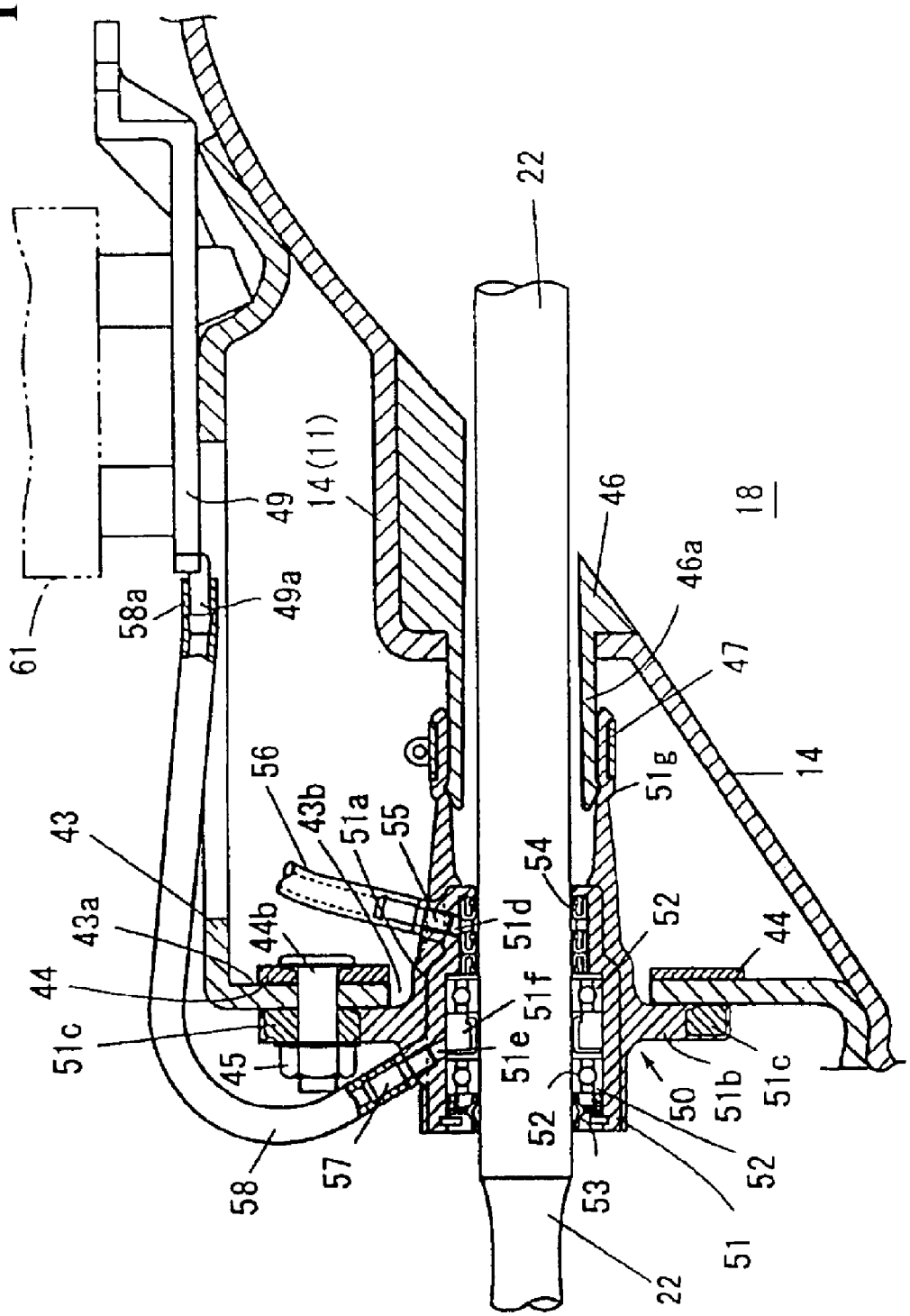
FIG. 6 is a sectional view of a drive shaft bearing structure for a personal watercraft according to a second embodiment of the present invention.
Figure 7:
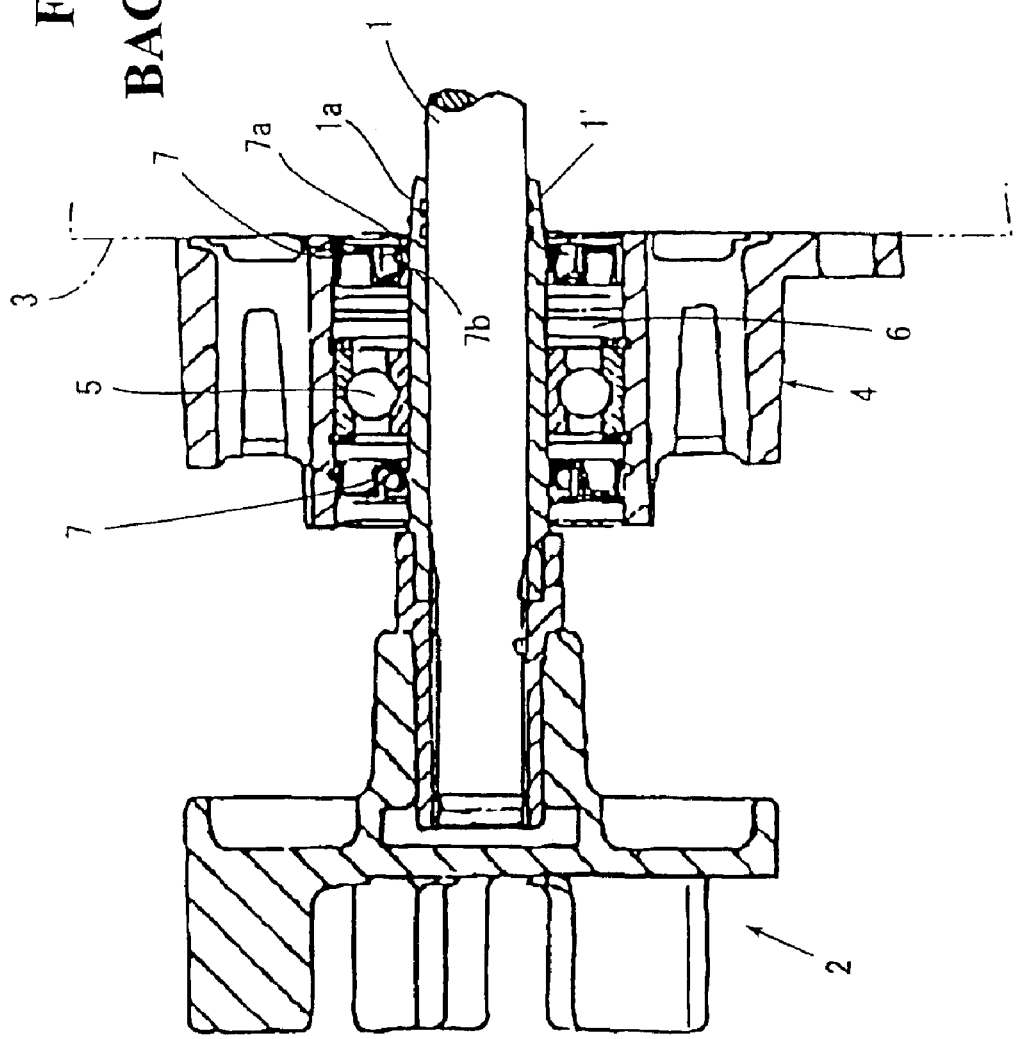
FIG. 7 is an illustration of the background art.

The present invention will hereinafter be described with reference to the accompanying drawings. FIG. 1 is a partially cutout, side view of a personal watercraft having a a drive shaft bearing structure for watercraft according to a first embodiment of the present invention. FIG. 2 is a general plan view of the same of the personal watercraft shown in FIG. 1. FIG. 3 is a sectional view a jet pump and a bearing structure of a drive shaft according to the present invention. FIG. 4 is a partial, enlarged view of the structure shown in FIG. 3; FIG. 5 is a partial, enlarged view of the structure shown in FIG. 4. FIG. 6 is a sectional view of a drive shaft bearing structure for a personal watercraft according to a second embodiment of the present invention.

As shown in FIG. 1 and FIG. 2, the small-type planing watercraft 10 is a saddle ride type watercraft. A passenger is seated on a seat 12 on a watercraft body 11, and the watercraft can be operated by gripping a rudder handle 13 provided with a throttle lever. The watercraft body 11 is a buoyant structure in which a hull 14 and a deck 15 are jointed to each other to form a space 16 inside. In the inside of the space 16, an engine 20 is mounted on the hull 14, and a jet pump (jet propulsion pump) 30 as a propelling device driven by the engine 20 is provided at a rear portion of the hull 14.

The jet pump 30 (See FIG. 3) includes an impeller 32 disposed in a conduit 18 extending from a water intake port 17 opening at the bottom of the watercraft to a nozzle port 31c2 opening at the rear end of the watercraft body. The jet pump 30 also includes a deflector 38 and a shaft (drive shaft) 22 for driving the impeller 32 connected to an output shaft 21 (See FIGS. 1 and 4) of the engine 20 through a coupler 23, e.g., a driving-side coupler 23a and a driven-side coupler 23b. Therefore, when the impeller 32 is rotationally driven by the engine 20 through the coupler 23 and the shaft 22, water taken in through the water intake port 17 is jetted from the nozzle port 31c2 through the deflector 38, and the watercraft body 11 is propelled. The driving rotational frequency of the engine 20, e.g., the propulsion force of the jet pump 30, is operated by a turning operation of the throttle lever 13a (See FIG. 2) of the operating handle 13. The deflector 38 is connected to the operating handle 13 by an operating wire (not shown), and is turned by the operation of the handle 13 for changing the course of the watercraft body 11.

In FIG. 1, a towing hook 19 utilized at the time of towing an object to be towed, e.g., a rubber watercraft or the like, is fixed to a rear portion of the watercraft body 11. As shown in FIG. 3, the jet pump 30 also includes a duct 31 forming the conduit 18 in communication with the water intake port 17 provided at a bottom portion of the watercraft body 11, the impeller 32 disposed in the duct 31, a bearing portion 33 of the impeller provided in the duct 31, and a cap 34 for closing the rear end of the bearing portion 33. The jet pump 30 is detachably fitted to the hull 14 by fixing a flange portion 31d formed at a front portion of the duct 31 to the hull 14 by bolts not shown.

The duct 31 includes an impeller containing portion 31a, a bearing containing portion 31b, and a nozzle portion 31c, in which the impeller containing portion 31a and the bearing containing portion 31b are formed as one body with each other. The bearing portion 33 is integrally formed in the bearing containing portion 31b through a stationary vane 31b1. In the impeller 32, a front portion of a boss portion 32a is engaged with a spline 22b formed at the rear end of the drive shaft 22, and the impeller 32 is rotated together with the drive shaft 22. The shaft 22 has its tip end portion 22a connected to the output shaft 21 of the engine 20 mounted on the watercraft body 11 through the coupler 23 (See FIG. 4).

A support shaft 35 for supporting a rear portion 32b of the boss portion 32a of the impeller 32 is rotatably supported on the bearing portion 33 through a ball bearing 33a. The support shaft 35 is provided at its tip with a male screw 35a, which is mated with a female screw formed at a rear portion 32b of the boss portion 32a of the impeller 32 for connecting the impeller 32 and the support shaft 35. Therefore, a front portion of the boss portion 32a of the impeller 32 is connected to the shaft 22, and the rear portion 32b of the boss portion is connected to the support shaft 35, so that the impeller 32 is rotated together with the shaft 22 and the support shaft 35.

A front portion of the cap 34 is provided with an insertion portion (tubular portion) 34b for insertion into a rear portion of the bearing portion 33. The front portion of the cap 34 is provided with three insertion holes 34c (only one of them is shown) for screws 36 (See FIG. 3). The tubular insertion portion 34b is provided with a fitting groove for an O-ring (not shown). Therefore, the O-ring is fitted into the insertion portion 34b of the cap 34, the insertion portion 34b is inserted (pressed) into a rear portion of the bearing portion 33 as shown in FIG. 3, and the cap 34 is fitted to the rear portion of the bearing portion 33 by the screws 36.

A surface for contacting the bearing portion 33 of the cap 34 is provided with a partial cutout 34d. During maintenance, the screws 36 are removed, and the tip of a tool (for example, screw driver) is put into the cutout 34d, whereby the cap 34 can be easily detached. A portion of the inside circumferential surface of the nozzle portion 31c facing toward the cap 34 is provided with a stationary vane 31c1 directed toward the cap 34. A bilge pipe 37 for discharging bilge water present at the bottom of the watercraft is inserted in the nozzle portion 31c. The bilge pipe 37 is connected to a bilge pipe 60 in the watercraft body through conduits 31e, 31f provided at an upper portion of the duct 31 and a joint pipe 31g. The joint pipe 31g on the side of the jet pump 30 and the bilge pipe 60 are detachably and press-fitted to each other. The bilge pipe 60 can also be detached from the joint pipe 31g at the time of removing the jet pump 30 from the hull 14. In addition, the above-mentioned deflector 38 is rotatably fitted to a rear portion of the nozzle portion 31c to permit turning of the deflector 38.

As shown in FIGS. 3 to 5, a bearing cover 43 is fixed to the hull 14, and a bearing body 50 provided with a rubber damper as a bearing body is fixed to the bearing cover 43. The bearing body 50 is for rotatably supporting an intermediate portion of the shaft 22 with respect to the watercraft body 11. The bearing body 50 includes a rubber, main body 51 including a rubber damper portion, a plurality of bearing members (in the structure shown, two ball bearings) 52, 52 contained in the main body 51 and disposed with a spacing therebetween for rotatably supporting the shaft 22, a seal member 53 mounted on the engine side of the bearings 52, and a seal member 54 (in this embodiment, three seal members 54a, 54b, 54c as shown in FIG. 5) mounted on the jet pump 30 side (the conduit 18 side) of the bearings 52. The main body 51 includes a tubular portion 51a and a flange portion 51b integral with the tubular portion 51a. The bearings 52 and the seal members 53 and 54 are mounted in the tubular portion 51a.

As shown in FIG. 5, the seal members disposed on both sides of the bearings 52, e.g., the seal member 53 disposed on the engine side and the seal member 54a disposed on the jet pump 30 side make contact with an outside circumferential surface 22e of the drive shaft 22, thereby partitioning a bearing chamber 51f for containing the bearing member 52. The bearing chamber 51f is formed as a space surrounded by an inside circumferential surface 51a1 of the tubular portion 51a, the outside circumferential surface 22e of the shaft 22, an inside surface 53a of the seal member 53, and an inside surface 54a1 of the seal member 54a. Besides, the space (51f) forms a grease reservoir between the bearings 52, 52.

The seal members 53, 54a disposed on both sides of the bearing 52 are disposed so that grease (not shown) in the bearing chamber 51f does not leak through contact portions 53e, 54e of these seal members and the outside circumferential surface 22e of the drive shaft 22. In this embodiment, the seal member 53 is a ring-shaped seal member roughly Y-shaped in cross section, and includes ring pieces 53d1, 53d2 bifurcated in cross section, including two ring-shaped edge line portions 53e1, 53e2. The edge line portions 53e1, 53e2 make contact with the outside circumferential surface 22e of the shaft 22, and a first ring piece 53d1 of the ring pieces 53d1, 53d2 is disposed to extend into the bearing chamber 51f. Therefore, when the inside pressure in the bearing chamber 51f is raised, the pressure energizes the first ring piece 53d1 toward the shaft 22, e.g., so as to strongly press the edge line portion 53e1 against the shaft 22. Therefore, even when the inside pressure in the bearing chamber 51f is raised, a gap is not generated between the edge line portion 53e1 and the outside circumferential surface 22e of the shaft. Accordingly, the grease or air in the bearing chamber 51f does not leak out through a gap between the edge line portion 53e1 and the outside circumferential surface 22e of the shaft as with the previous arrangements of the background art.

The seal member 54a is a ring-shaped seal member roughly U-shaped in cross section, and includes two ring-shaped edge portions 54e, 54e on the shaft 22 side of the ring piece 54d on the inside in the radial direction. The edge line portions 54e, 54e make contact with the outside circumferential surface 22e of the shaft 22, and the ring piece 54d is disposed to extend into the bearing chamber 51f. Therefore, when the inside pressure in the bearing chamber 51f is raised, the pressure energizes the ring piece 54d extending into the bearing chamber 51f toward the shaft 22, e.g., so acts as to press the edge portion 54e strongly against the shaft 22. Therefore, even when the inside pressure in the bearing chamber 51f is raised, a gap is prevented from being generated between the edge portion 54e and the outside circumferential surface 22e of the shaft. Accordingly, the grease or air in the bearing chamber 51f does not leak out through a gap between the edge portion 54e and the outside circumferential surface 22e of the shaft.

The seal members 542b, 54c are mainly for sealing water W which would come from the exterior of the watercraft into the watercraft, and a grease chamber 51h is formed between the seal members 54b, 54c. The basic configuration of the seal members 542b, 54c is the same as that described with respect to the above-mentioned seal member 54a. The seal member 54b is disposed so that its ring piece 54b1 comes into the grease chamber 51h, and the seal member 54c is disposed so that its ring piece 54c1 is directed toward the outside of the grease chamber 51h. Therefore, when the inside pressure in the grease chamber 51h is raised, the grease in the grease chamber 51h displaces or deforms the ring piece 54c1 of the seal member 54c so as to come away from the shaft 22, whereby the grease leaks out to the exterior of the grease chamber 51h through a gap formed between the ring piece 54c1 and the outside circumferential surface 22e of the shaft.

The seal member 54b on the bearing chamber 51f side is disposed so that its ring piece 54b1 extends into the inside of the grease chamber 51h. Therefore, even if the inside pressure in the grease chamber 51h is raised, penetration of the grease or air in the grease chamber 51h into the bearing chamber 51f does not occur. Accordingly, even if water has penetrated into the grease chamber 51h, the water is prevented from leaking into the bearing chamber 51f.

As shown in FIG. 4, the tubular portion 51a of the bearing body 50 forms a rubber cylindrical portion 51g extending toward a cylindrical portion 46a on the side of the watercraft body described in greater detail hereinafter. In addition, the flange portion 51b of the bearing body 50 is provided integrally with a metallic reinforcing member 51c. A front wall 43a of the bearing cover 43 is provided with a hole 43b for inserting the tubular portion 51a of the bearing body 50, and a metallic ring-shaped base 44 is closely adhered to the periphery of the hole 43b by an adhesive. A bolt 44b is integrally planted in the base 44.

The bearing body 50 is fixed to the bearing cover 43, e.g., therefore, to the watercraft body 11, by inserting the rubber cylindrical portion 51g in the hole 43b of the bearing cover 43, inserting the bolt 44b in the reinforcing member 51c of the flange portion 51b, and mating a nut 45 to the bolt 44b from the inside of the watercraft body and fastening the flange portion 51b (and therefore, the reinforcing member 51c). The rear end of the rubber cylindrical portion 51g is connected to the cylindrical portion 46a of a joint rubber 46 fitted to the hull 14 by close adhesion with an adhesive from the side of the conduit 18, by a ring-shaped clamp 47.

As shown in FIGS. 4 and 5, the cylindrical portion 51a of the bearing body 50 is provided with a grease supply hole 51d communicated to the grease chamber 51h, and a breather hole 51e in communication with the bearing chamber 51f. A grease supply hose 56 is connected to the grease supply hole 51d through a connecting pipe 55, and a grease nipple 56a is provided at the tip end of the grease supply hose 56. The grease nipple 56a is fixed to the deck 15 by co-fastening with the above-mentioned towing hook 19 (See FIG. 1) by a fitting fixture 56b, e.g., near an opening 15a formed upon opening the seat 12.

Therefore, by opening the seat 12, grease can be easily supplied from the grease nipple 56a into the grease chamber 51h through the grease supply hose 56. A breather hose (for example, a rubber tube) 58 including an extendable-contractable elastic member (for example, rubber) is detachably connected to the breather hole 51e through a connecting pipe 57. The tip end 58a of the breather hose 58 is fixed to an appropriate portion of the watercraft body 11 (the hull 14 or the deck 15) by a fitting fixture 58b.

Therefore, when the grease or air in the bearing chamber 51f expands due to a temperature rise in the bearing chamber 51f, the excess grease or air is released into the breather hole 51e, the connecting pipe 57 and the breather hose 58. The seal members 53, 54a are not excessively deformed or broken due to the rise in the inside pressure in the bearing chamber 51f since the seal members 53, 54a are disposed on both sides of the bearing 52 preventing the grease (not shown) in the bearing chamber 51f from leaking out through the contact portions 53e, 54e and the outside circumferential surface 22e of the drive shaft 22.

As shown in FIG. 4, the tip end 58a of the breather hose 58 opens into the watercraft inside 16 on the upper side of the bearing chamber 51f. The tip end 58a is disposed on the upper side of a watercraft inside opening port 48a of an intake duct 48 for communication between the inside 16 of the watercraft and outside air. Since the breather hose 58 is detachably connected to the connecting pipe 57, the breather hose 58 can be detached and grease can be charged into the bearing chamber 51f through the connecting pipe 57 for maintenance. As is clear from the above description, the breather passage includes the breather hole 51e, the connecting pipe 57 and the breather hose 58.

Accordingly, the following advantageous actions or effects can be obtained by the drive shaft bearing structure for watercraft as described above. (a) Even when the temperature in the bearing chamber 51f is raised and grease or air in the bearing chamber 51f expands, the expanded portion of the grease or air is released into the breather passage (51e, 57, 58), whereby rise of the inside pressure in the bearing chamber 51f is prevented or markedly suppressed. Therefore, the seal members 53, 54a are not deformed by the inside pressure in the bearing chamber 51f, and a gap prevented from being generated between the seal members 53, 54a and the outside circumferential surface 22e of the shaft. Accordingly, the grease or air in the bearing chamber 51f will not leak to the exterior through a gap between the seal members 53, 54a and the outside circumferential surface 22e of the shaft as with the previous systems of the background art.

In addition, the grease or air released into the breather passage due to the rise of the temperature in the bearing chamber 51f returns into the bearing chamber 51f when the running of the watercraft 10 is stopped and the temperature lowers inside the bearing chamber 51f. Therefore, according to this drive shaft bearing structure for watercraft of the first embodiment, excessive deformation of the seal members 53, 54a due to the rise of the inside pressure is prevented in the bearing chamber 51f. At the same time, even when the running and stopping of the watercraft is repeated, e.g., the rise and the fall of the temperature in the bearing chamber and the expansion and contraction of the grease or air in the bearing chamber 51f are repeated, the amount of the grease in the bearing chamber 51f is either not reduced and/or it is negligibly reduced. Accordingly, the frequent maintenance required in the systems of the background art mentioned above is basically unnecessary and/or the frequency of the maintenance requirements is reduced with the present invention.

Since the seal members 53, 54a are disposed so that the grease in the bearing chamber 51f does not leak out through the contact portions between the seal members 53, 54a and the outside circumferential surface 22e of the drive shaft 22, leakage of the grease from the bearing chamber 51f is prevented and/or reduced. If no measures are provided, there may be the risk that the seal members 53, 54a might be excessively deformed due to the rise of the inside pressure in the bearing chamber 51f. However, in the bearing structure according to this embodiment, the breather passage (51e, 57, 58) is in communication with the bearing chamber 51f excessive deformation is avoided or reduced.

According to the bearing structure of the present invention, the seal members 53, 54a are disposed so that the grease in the bearing chamber 51f does not leak out through the contact portions between the seal members 53, 54a and the outside circumferential surface 22e of the drive shaft 22. Accordingly, leakage of the grease in the bearing chamber 51f is prevented. In addition, excessive deformation of the seal members 53, 54a due to the rise of the inside pressure in the bearing chamber 51f is prevented and/or reduced.

(c)The end portion 58a on the opposite side of the bearing chamber 51f of the breather passage is opened for relieving excessive pressure. Therefore, even when the temperature inside the bearing chamber 51f is raised and the grease or air in the bearing chamber 51f expands, the excess grease or air is released smoothly toward the breather passage, whereby a rise of the inside pressure is prevented within the bearing chamber 51f. The end portion 58a on the opposite side of the bearing chamber 51f of the breather passage is opened into the inside 16 of the watercraft on the upper side of the bearing chamber 51f. Therefore, the grease released into the breather passage due to the rise of the temperature inside the bearing chamber 51f will not flow over from the end portion 58a of the breather passage, and instead securely returns into the bearing chamber 51f when the running of the watercraft 10 is stopped and the temperature lowers inside the bearing chamber 51f.

(d) Since the end portion 58a on the opposite side of the bearing chamber 51f of the breather passage is disposed on the upper side of the inside of the watercraft opening port 48a, the water which may be sucked into the inside 16 of the watercraft through the intake duct 48 together with air will be scattered and will not easily enter into the breather passage through the end portion 58a of the breather passage. Therefore, there is little risk that water droplets may enter into the bearing chamber 51f through the breather passage.

(e) Since the breather passage includes the breather hose 58 detachably fitted to the bearing body 50 and grease can be poured into the bearing chamber 51f by detaching the breather hose 58, the grease can be charged into the bearing chamber 51f without drawing out the drive shaft 22 from the bearing body 50. Therefore, even if maintenance (charging of grease) is necessary, the maintenance can be performed easily.

Since two bearing members 52, 52 are disposed with a spacing therebetween in the bearing chamber 51f and the grease reservoir is formed between the bearing members 52, 52, a large amount of grease can be charged in the bearing chamber 51f due to the presence of the grease reservoir.

FIG. 6 is a sectional view of a drive shaft bearing structure for a personal watercraft according to a second embodiment of the present invention. In FIG. 6, the portions which are the same with or equivalent to those in the first embodiment are denoted by the same symbols.

The second embodiment differs from the first embodiment in that the end portion 58a on the opposite side of the bearing chamber 58 of the breather passage is closed. A tray 49 for fitting electrical equipments 61 to the watercraft body 11, and a plug 49a formed integrally with the tray 49 is detachably fitted to the opening 58a of the breather hose 58, whereby the opening 58a of the breather hose 58 is closed.

According to this embodiment also, the same actions or effects with the first embodiment above can be obtained. Since the end portion 58a on the opposite side of the bearing chamber, of the breather passage is closed, penetration of water can be prevented from entering into the breather passage. In addition, since the end portion 58a is closed, the expansion of the grease or air released into the breather passage is absorbed by the extension of the breather hose 58 making up a part of the breather passage. Accordingly, leakage of the grease through the end portion 58a from the breather passage is avoided. Therefore, the grease released into the breather passage due to the rise of the temperature inside the bearing chamber 51f returns securely into the bearing chamber 51f when the running of the watercraft is stopped and the temperature is lowered inside the bearing chamber 51f.

Incidentally, since at least a portion (in this case, the breather hose 58) of the breather passage is formed of an extendable-contractable elastic member, e.g., rubber tubing, and the end portion 58a of the breather passage is closed, the breather hose 58 extends or contracts according to the inside pressure in the bearing chamber 51f. Therefore, the release of the grease or air contained in the bearing chamber 51f into the breather passage and the return thereof from the breather passage are not hampered.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A drive shaft bearing structure for a watercraft having a drive shaft, an impeller and a watercraft body, said drive shaft bearing structure comprising:
   a bearing body rotatably supporting the drive shaft for driving the impeller on the watercraft body, said bearing body including
      a bearing member rotatably supporting said drive shaft,
      a bearing chamber containing said bearing member, and
      a plurality of seal members disposed on a forward side and an after side of said bearing member, said seal members partitioning said bearing chamber and making contact with an outside circumferential surface of said drive shaft; and
   a breather passage, said breather passage being in communication with said bearing chamber and ambient air to allow for expansion of air and lubricant and having a first end portion and a second end portion.

2. The drive shaft bearing structure according to claim 1, wherein the second end portion of said breather passage opens into an interior of said watercraft body along an upper side of said bearing chamber.

3. The drive shaft bearing structure according to claim 2, further comprising an opening port for an intake duct said second end portion of said breather passage being disposed along the opening port of the duct for communication between the interior of the watercraft and ambient air.

4. The drive shaft bearing structure according to claim 1, wherein at least a portion of said breather passage is formed of a contractible, elastic member.

5. The drive shaft bearing structure according to claim 1, wherein said breather passage includes a breather hose detachably fitted to said bearing body.

6. The drive shaft bearing structure according to claim 1, wherein a plurality of said bearing members are disposed within said bearing chamber, and a grease reservoir is formed between at least a pair of said bearing members separated by a predetermined spacing.

7. A drive shaft bearing structure for a watercraft having a drive shaft, an impeller, and a watercraft body, said drive shaft bearing structure comprising:
   a bearing body rotatably supporting the drive shaft for driving the impeller on the watercraft body, said bearing body including
      a bearing member rotatably supporting said drive shaft, said bearing member having a first side and a second side,
      a bearing chamber containing said bearing member, and
      a plurality of seal members disposed on the first side and the second side of said bearing member, said seal members each having at least one contact portion, said seal members partitioning said bearing chamber and engaging an outside circumferential surface of said drive shaft with said at least one contact portions;

a grease chamber, wherein said seal members prevent grease within said grease chamber from leaking from said grease chamber between said contact portions of said seal members and said outside circumferential surface of said drive shaft; and a breather passage, said breather passage being in communication with said bearing chamber and ambient air to allow for expansion of air and grease and having a first end portion and a second end portion.

8. The drive shaft bearing structure according to claim 7, wherein the second end portion of said breather passage opens into an interior of said watercraft body along an upper side of said bearing chamber.

9. The drive shaft bearing structure according to claim 8, further comprising an opening port for an intake duct said second end portion of said breather passage being disposed along the opening port of the duct for communication between the interior of the watercraft and ambient air.

10. The drive shaft bearing structure according to claim 9, wherein at least a portion of said breather passage is formed of a contractible, elastic member.

11. The drive shaft bearing structure according to claim 7, wherein at least a portion of said breather passage is formed of a contractible, elastic member.

12. The drive shaft bearing structure according to claim 7, wherein said breather passage includes a breather hose detachably fitted to said bearing body.

13. A watercraft drive shaft bearing structure comprising:

a drive shaft;

an impeller operatively driven by said drive shaft;

a rubber bearing body rotatably supporting the drive shaft for driving the impeller;

a bearing member rotatably supporting said drive shaft, said bearing member having a first side and a second side;

a bearing chamber containing said bearing member;

a plurality of seal members disposed on the first side and the second side of said bearing member, said seal members each having at least one contact portion and said seal members partitioning said bearing chamber and engaging an outside circumferential surface of said drive shaft with said at least one contact portions;

a grease chamber, wherein said seal members prevent grease within said grease chamber from leaking out from between said contact portions of said seal members and said outside circumferential surface of said drive shaft; and a breather passage, said breather passage being in communication with said bearing chamber and ambient air to allow for expansion of air and grease and having a first end portion and a second end portion, said first end portion detachably connected to said bearing body to permit a delivery of grease to said grease chamber.

14. The drive shaft bearing structure according to claim 13, wherein the second end portion of said breather passage opens into an interior of said watercraft body along an upper side of said bearing chamber.

15. The drive shaft bearing structure according to claim 13, further comprising an opening port for an intake duct said second end portion of said breather passage being disposed along the opening port of the duct for communication between the interior of the watercraft and ambient air.

* * * * *